United States Patent
Weber

(10) Patent No.: US 11,368,578 B2
(45) Date of Patent: Jun. 21, 2022

(54) MOBILE COMMUNICATION DEVICE WITH MANAGED SWAP OF EXCLUSIVE FEATURES

(71) Applicant: Katherine Joanne Weber, Indianapolis, IN (US)

(72) Inventor: Katherine Joanne Weber, Indianapolis, IN (US)

( * ) Notice: Subject to any disclaimer, the term of this patent is extended or adjusted under 35 U.S.C. 154(b) by 0 days.

(21) Appl. No.: 15/281,863

(22) Filed: Sep. 30, 2016

(65) Prior Publication Data

US 2017/0099386 A1 Apr. 6, 2017

Related U.S. Application Data

(60) Provisional application No. 62/284,454, filed on Oct. 1, 2015.

(51) Int. Cl.
| | |
|---|---|
| *H04W 8/20* | (2009.01) |
| *H04W 12/06* | (2021.01) |
| *H04W 60/06* | (2009.01) |
| *H04W 12/43* | (2021.01) |
| *H04W 84/04* | (2009.01) |
| *H04W 84/12* | (2009.01) |
| *H04M 3/42* | (2006.01) |

(52) U.S. Cl.
CPC ......... *H04M 3/42263* (2013.01); *H04W 8/20* (2013.01); *H04W 12/06* (2013.01); *H04W 60/06* (2013.01); *H04W 12/43* (2021.01); *H04W 84/042* (2013.01); *H04W 84/12* (2013.01)

(58) Field of Classification Search
CPC ... H04M 3/42263; H04W 8/20; H04W 60/06; H04L 41/50
See application file for complete search history.

(56) References Cited

U.S. PATENT DOCUMENTS

| | | | |
|---|---|---|---|
| 8,139,509 B2 | 3/2012 | Krivopaltsev | |
| 8,412,361 B1 * | 4/2013 | Reynolds | ............... A61B 17/00 700/79 |
| 8,613,070 B1 * | 12/2013 | Borzycki | ............ G06F 21/6218 726/8 |
| 2004/0204021 A1 * | 10/2004 | Cocita | ................. H04M 1/2757 455/410 |
| 2004/0235523 A1 * | 11/2004 | Schrire | ................. H04W 24/04 455/558 |

(Continued)

*Primary Examiner* — Asghar H Bilgrami
(74) *Attorney, Agent, or Firm* — Ritchison Law Offices PC; John D Ritchison

(57) ABSTRACT

Two electronic devices are configured with software that can enable or disable features such as voice calling, text messaging, or mobile data. By powering on a configured device or interacting with a user interface of the software, a user may choose which device is active and which device is inactive for these features. The software allows the phones to communicate with each other and/or remote servers in order to ensure that only one device is active for these features at any one time. In this manner, a user can share a single service plan, phone number, and/or SIM data between two devices and swap between them without conflicting with technology or contract requirements of a mobile service provider. This allows a user to switch to a secondary phone in order to avoid damaging or losing a primary phone, or to quickly replace a lost or damaged primary phone.

2 Claims, 5 Drawing Sheets

(56) References Cited

U.S. PATENT DOCUMENTS

| | | | |
|---|---|---|---|
| 2005/0239440 A1* | 10/2005 | Chen | H04W 12/1206 455/411 |
| 2005/0282584 A1* | 12/2005 | Faisy | H04W 12/06 455/558 |
| 2009/0040947 A1* | 2/2009 | Krivopaltsev | H04L 41/0856 370/255 |
| 2009/0093271 A1* | 4/2009 | Martin | H04M 1/2757 455/558 |
| 2010/0063960 A1* | 3/2010 | Lehto | H04W 24/04 711/E12.001 |
| 2010/0159878 A1* | 6/2010 | Kim | H04L 63/12 455/411 |
| 2010/0210240 A1* | 8/2010 | Mahaffey | H04L 63/14 455/411 |
| 2011/0028126 A1* | 2/2011 | Lim | H04L 63/0853 455/411 |
| 2011/0145927 A1* | 6/2011 | Hubner | G06F 21/123 726/26 |
| 2011/0263296 A1* | 10/2011 | Baietto | G06F 8/60 455/558 |
| 2012/0159152 A1* | 6/2012 | Ha | H04L 63/06 713/155 |
| 2012/0202462 A1* | 8/2012 | Sudhakar | H04W 4/60 455/411 |
| 2012/0231736 A1* | 9/2012 | Amiel | H04L 63/0853 455/41.1 |
| 2012/0233663 A1* | 9/2012 | Ortiz | H04W 12/08 726/4 |
| 2013/0109371 A1* | 5/2013 | Brogan | G06F 1/1692 455/420 |
| 2014/0134986 A1* | 5/2014 | Yasumoto | H04W 12/04 455/414.1 |
| 2014/0297823 A1* | 10/2014 | Prakash | H04L 41/0816 709/223 |
| 2015/0195133 A1 | 7/2015 | Sheets | |
| 2015/0310086 A1* | 10/2015 | Tee | H04L 41/065 707/737 |
| 2016/0088467 A1* | 3/2016 | Reddem | H04W 8/20 455/418 |
| 2016/0234340 A1 | 8/2016 | Dayan | |
| 2016/0286014 A1* | 9/2016 | Balogh | G06F 1/1656 |

\* cited by examiner

MOBILE COMMUNICATION DEVICE WITH MANAGED SWAP OF EXCLUSIVE FEATURES

REFERENCE TO RELATED APPLICATION

This application claims the benefit of U.S. provisional patent application 62/284,454, filed Oct. 1, 2015, and titled "Spare Cell," the disclosure of which is hereby incorporated by reference in its entirety.

FIELD

The disclosed technology pertains to a system and method for managing operation of two mobile devices for use on a single telephone number.

BACKGROUND

In the early days of mobile phones, they were largely considered to be a convenience. With extremely limited battery life and access to small and scattered cellular coverage zones, early mobile phones were often tethered to an automobile or were used for occasional business purposes, but were rarely relied upon as a necessity. With the rise of full-featured smart phones, powerful batteries, and national cellular networks providing both voice communication and data communication, many owners would now cite their mobile device as one of their most important possessions, and one that they would be extremely inconvenienced without.

It is not uncommon for an owner of a smart phone to rely on their phone to allow friends, family, and employers to contact them, notify them of appointments and tasks, handle payment at retail locations, provide audio and video entertainment, provide the safety and security of quick access to emergency services, request transportation and other services, and allow near limitless information to be accessed from the interne. Further, often the list of contacts and phone numbers that the owner uses may only exist on their phone. While backing up to the cloud is a new option for this dilemma, some owners may not want to take that route because of privacy fears, or the inconvenience and complexity of this solution, which may include setting up new services outside of their phone. With the variety of useful and recreational features that modern phones offer, it is no surprise that some studies suggest that smartphone users spend, on average, almost five hours per day using their mobile device.

For an average user, who relies upon their mobile device for a number of passive features in addition to actively using it for almost five hours per day, the usability of their device is extremely important. Unfortunately, mobile devices are extremely complex and somewhat fragile, meaning that a user often spends five hours a day holding a device that is extremely important to them, and that might be damaged or destroyed if it were to be dropped, submerged in water, left in the sun, or subjected to an electrical discharge. Even where such hazards do not leave a device unusable, mobile device screens are frequently scratched or cracked, which can affect their usability and aesthetic appeal.

While many products and industries have attempted to address the useful but fragile nature of mobile devices, the results can be expensive and frustrating for users. As new mobile devices are released, manufacturers quickly design and sell cases that range from lightweight flexible skins that provide minimal shock protection to complex, multi-piece hardened cases that provide extreme shock protection, water protection and other passive safety features. However, users often find that such cases ruin the aesthetic appeal of a mobile device or make it uncomfortable to hold or place in a pocket. Mobile device insurance and service plans have also become a major source of revenue, with mobile service providers often rolling insurance premiums into an owner's monthly bill. While these plans might allow a user to replace a damaged device, they are often paired with expensive premiums, deductibles of several hundred dollars, and many restrictions on the types of damage they cover. Further, even where a device can be replaced under an insurance plan, there is still the aggravation of waiting on a device to ship and arrive and replicating configurations, data, and applications from an old device to a new device.

While many products and services have attempted to address the fragile nature of mobile devices, many owners find them to be inconvenient, expensive, or otherwise undesirable. This is especially true for mobile device users that have active lifestyles that might place their phone at additional risk of damage or loss that might not be prevented by a case or covered by an insurance plan. For example, those employed in a service industry such as construction might be at additional risk to drop, lose, or otherwise damage a mobile device. Similarly, people who participate in sports such as running, boating, or rock climbing might be at an increased risk to drop, submerge, or otherwise damage a mobile device. What is needed, therefore, is an improved system for allowing a mobile device owner to switch their service between a first mobile device and a second mobile device in order to mitigate the risk of damage or loss of one of the devices, or in order to quickly replace one of the mobile devices in the event of a loss or damage of the other.

BRIEF DESCRIPTION OF THE DRAWINGS

The drawings and detailed description that follow are intended to be merely illustrative and are not intended to limit the scope of the invention as contemplated by the inventor(s).

DETAILED DESCRIPTION

The inventor has conceived of novel technology that, for the purpose of illustration, is disclosed herein as applied in the context of systems and software for use with mobile devices. While the disclosed applications of the inventor's technology satisfy a long-felt but unmet need in the art of systems and software for use with mobile devices, it should be understood that the inventor's technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

Figure 1:
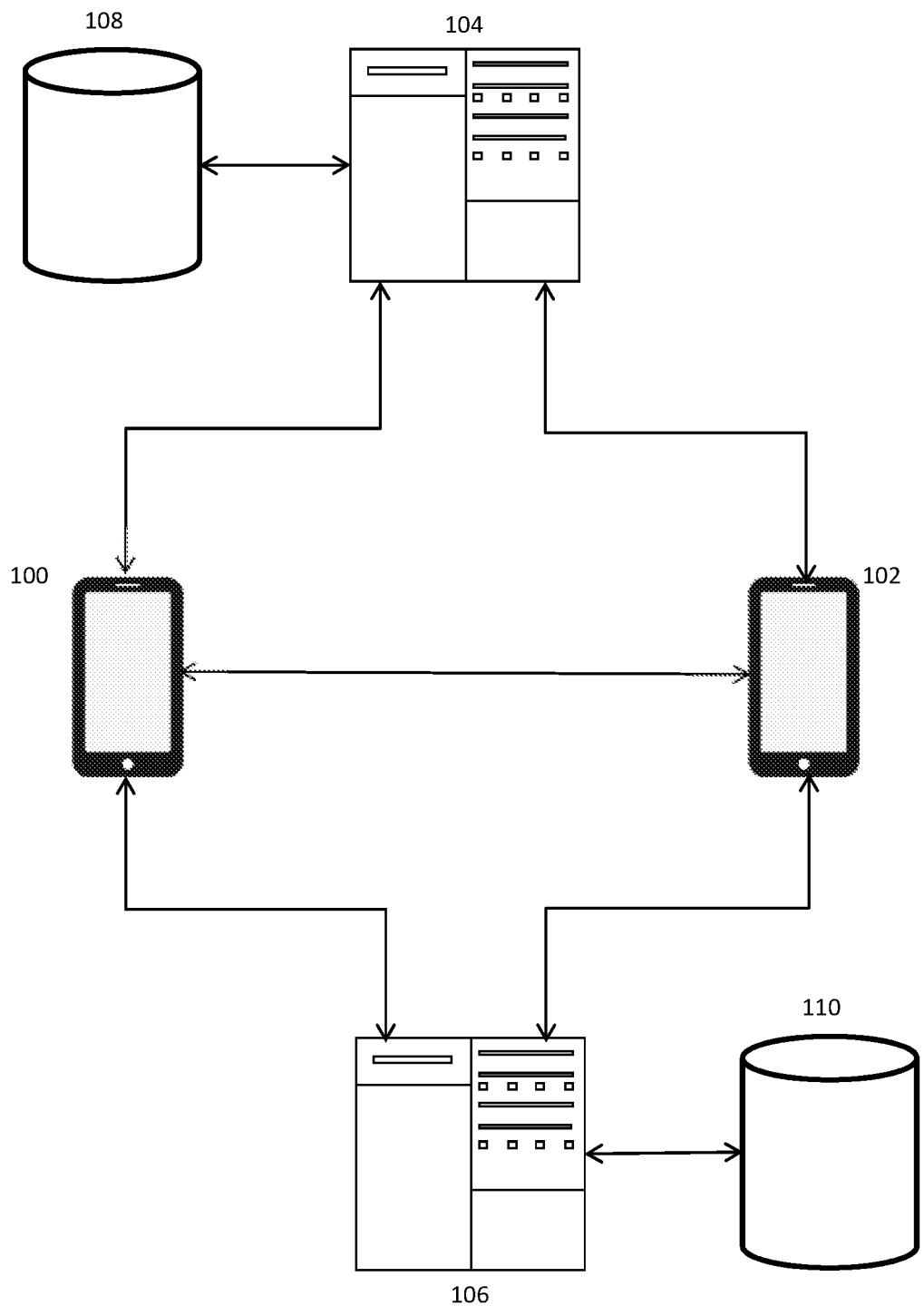
FIG. 1 is a schematic diagram of an exemplary system configured to manage swapping of features and configurations between a first and second mobile device.

Turning now to the figures, FIG. 1 shows a schematic diagram of an exemplary system configured to manage swapping of features and configurations between a first and second mobile device. The first mobile device (100) may be any personal electronic device having features, data, or configurations that a user may want to swap between the first mobile device (100) and the second mobile device (102) and use exclusively on a single mobile device at a time. The second mobile device (102) may be the same make and model of device or a similar device as the first mobile device (100), and will generally support some or all of the features of the first mobile device (100).

For example, in one embodiment the first mobile device (100) may be a fully featured smart phone such as an IOS smart phone, ANDROID smart phone, or WINDOWS smart phone, while the second mobile device (102) may be a simpler device that only supports a subset of features of the first mobile device (100) such as voice calling, text messaging, email, and calendar features. The above example provides a user with the flexibility to exclusively use the first mobile device (100) when a full feature set is desirable, or in situations where there is little risk in using the device, while also having the flexibility to swap to exclusively using the second mobile device (102) when only the core features of voice calling, text messaging, and email are needed or when there is an increased risk of damage or loss to the device. This may be advantageous for the user since the second mobile device (102) is a simpler and likely cheaper device having a subset of core features which could also be manufactured and designed in favor of durability over aesthetics since its use may be geared for activities like boating, running, climbing, hiking, construction, or other activities that may involve a high risk of damage to a standard mobile device.

As noted, it may also be advantageous for the second mobile device (102) to support the same or similar feature set as the first mobile device (100). In such an implementation a user could use the first mobile device (100) in situations that present a higher risk of damage or loss to the device, while knowing that they have the ability to easily and at their sole discretion swap to the second mobile device (102) in the event that the first mobile device (100) becomes unusable for any reason. This would allow the user to avoid periods of time where they have no usable device and are waiting for a repair or replacement, or waiting for a mobile service provider to manually switch services from a first device to a second device.

It should also be noted that, while much of the discussion in this disclosure may treat the first mobile device (100) and second mobile device (102) as smart phones, the technology disclosed herein can be broadly applied to many personal electronic devices including laptops, tablets, game systems, personal computers, mobile internet hot spots, or other similar electronic devices that a user may wish to exclusively swap one or more features from to a second device. For example, a small business might purchase several mobile internet hot spots for employees in the field and wish to share a single service plan between them. The ability to exclusively swap the hot spot features between the two or more hot spots might allow the company to save costs while also ensuring that the device will not be used in a way that conflicts with mobile service infrastructure or service plans.

As yet another example, an employee may have a laptop that is configured with software that might represent a security risk if it is present on more than one laptop at a time. For example, a VPN software or document management software that is configured to provide that employee access to critical resources across a network could represent a security risk if the employee were to have those applications configured for simultaneous use on a work laptop and a home laptop. The ability to exclusively swap the use of these configured applications between the work laptop or the home laptop allows the employee to exclusively use one device or the other for VPN or document management purposes while not being concerned that the other device, which may not be physically present, is being used for malicious purposes. Other similar examples will be apparent to one of ordinary skill in the art in light of the disclosure herein. Accordingly, the disclosure herein should be understood to extend beyond an implementation where the first and second mobile devices (100, 102) are smart phones, and any reference in the examples or figures to the mobile devices (100, 102) being smart phones is to provide clear examples and clarify the discussion of the disclosed technology, not to limit the scope of this disclosure.

As shown in FIG. 1, the first and second mobile devices (100, 102) may be in communication with each other, as well as or in the alternative to one or more of a provider server (104) and a swap server (106). One or more of the communication channels shown in FIG. 1 may be required in order to enforce exclusive availability of one or more features between the mobile devices (100, 102). Communication between the devices of FIG. 1 may include wireless communication over Wi-Fi, mobile data networks, near field communication, Bluetooth, RFID, or other wireless technologies, and may also include wired communication over Ethernet, USB, optical, HDMI, or other direct connections between the devices, as well as communication through shared memory such as a USB drive, SD card, or NFC beacon that might be connected to or in communication with the devices at separate times but which can be used to share data between the devices. Other ways in which one or more of the devices of FIG. 1 may be in communication with each other will be apparent to those of ordinary skill in the art in light of the disclosure herein.

The provider server (104) may be managed by a mobile services provider and may have software configurations and databases related to customers that subscribe to one or more of their services. In implementations where the provider server (104) is present, an active device database (108) may be accessed at or through the provider server (104). The active device database (108) may contain information that identifies a user or device and whether that user or device is active or inactive. This could include, for example, a user record indicating that a particular user is associated with the first mobile device (100) and second mobile device (102) for one or more features or services such as voice, text, and data, as well as an indication or flag indicating whether the first mobile device (100) or second mobile device (102) is currently active. With such data accessible within the active device database (108), if a user powers on, activates, or requests the use of features or services on a mobile device (100, 102), data is available at the provider server (104) that may be used to determine whether that device is able to activate and use those features or services without conflict.

A swap server (106) functions similarly to a provider server (104), with the primary difference being that a swap server (106) may be managed by a third party instead of a mobile service provider. This may be useful if, for example, certain mobile service providers have technical or business reasons for not participating in a system that allows users to share services between two or more devices. The swap server (106) maintains an active device database (110) that associates two or more devices with a user, and that indicates which of those two or more devices is currently the active device for one or more features. While each of the servers (104, 106) shown in FIG. 1 provides the advantage of being able to maintain a list of active devices in a network accessible location, neither is strictly necessary, and in some embodiments both are eschewed in favor of direct communication between the first mobile device (100) and second mobile device (102).

For example, in an implementation without any constantly accessible server, or where a typically accessible server is inaccessible for any reason, data indicating which device was currently active could be stored on each of the mobile devices (100, 102). If the first mobile device (100) is currently active for voice and text features, and the second mobile device (102) was powered on, it could communicate with the first mobile device (100) via Wi-Fi, Bluetooth, NFC, or another communication channel that is not exclusively tied to an active device. When contacted, the first mobile device (100) would provide an indication that it was active for voice and text and, based upon user inputs, would either remain active and instruct the second mobile device (102) to shut down or operate at a reduced feature level, or disable voice and text itself and allow the second mobile device (102) to exclusively take over those features.

Variations on the number and types of devices shown in FIG. 1 exist and will be apparent to one of ordinary skill in the art in light of this disclosure. For example, in some implementations of a system for managing device swapping and ensuring exclusive use of one or more features, there may be additional mobile devices (100, 102), additional servers (104, 106), and additional databases (108, 110) in order to provide additional flexibility and reliability to the system. Also, while not pictured, it should be understood that any of the servers (104, 106) could be configured to be accessible via web browser from a computer in order to manage active features for two or more devices. For example, in some implementations, device swapping may be initiated from a mobile device (100, 102) by powering the device on or by making a selection or user input on the user interface of that device. However, in others, the server or servers (104, 106) may be configured to allow a user to submit a command via a web browser or other software interface that, when received by the server (104, 106) swaps the one or more features by updating databases (108, 110) to indicate which devices are now active and which are now inactive, and provide information to each affected mobile device (100, 102) indicating that the device should enable or disable certain features in order to ensure the exclusive use aspect of the system.

Figure 2:
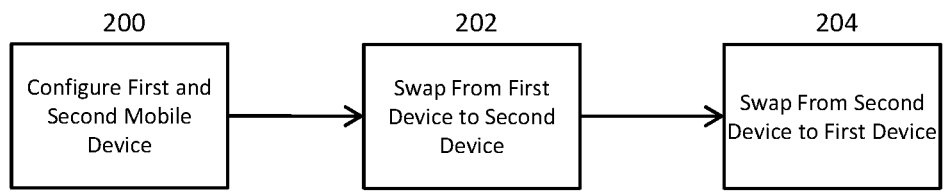
FIG. 2 is a flowchart of a set of high-level steps that a system could perform to manage swapping of features and configurations between a first and second mobile device.

Turning now to FIG. 2, that figure shows a flowchart of a set of high-level steps that a system could perform to manage swapping of features and configurations between a first and a second mobile device. These high-level steps include configuring (200) the first and second mobile devices for operation within the system, swapping (202) one or more features from the first mobile device to the second mobile device, and then at a later time swapping (204) the one or more features from the second mobile device back to the first mobile device. These steps presume a situation where a user wishes to swap to a second device temporarily, but could also apply where, for example, a first mobile device is lost or damaged and a user swaps to the second mobile device either permanently or until a true replacement for the first mobile device is obtained.

Figure 3:
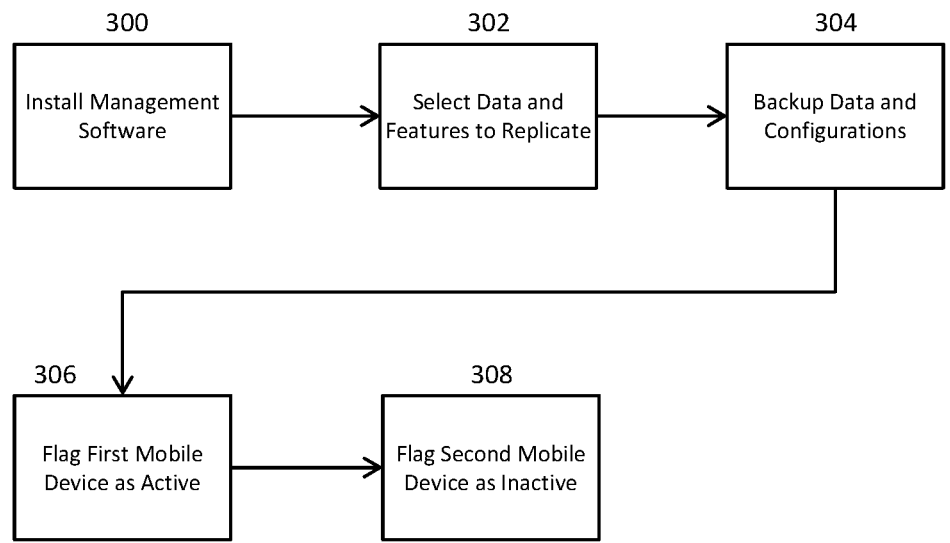
FIG. 3 is a flowchart of a set of steps that a system could perform to configure a first and second mobile device for use with the system of FIG. 1.

Several examples of the types of configuration that may be required to prepare a mobile device for use with the system are shown in FIG. 3. These steps could include installing (300) swap management software on each of the mobile devices (100, 102). The swap management software may vary by particular implementation, but will generally be an application that is configured and installed to run on each of the mobile devices (100, 102) whenever they are powered on. The swap management software may have several user interfaces that allow a user to, for example, request to activate certain features on the phone, manage configurations specific to the swap management software, enter passcodes or perform other authentication steps during a swap, and other similar activities.

The swap management software may also handle sending and receiving feature activation instructions, as well as enforcing activation instructions. For example, the swap management software on a first mobile device (100) may provide data to the second mobile device (102) indicating that the second mobile device should deactivate voice calling so that the first mobile device (100) can activate voice calling. The second mobile device (102), upon receiving such data, may interpret it via the swap management software, provide a response indicating that the data was received and is being acted upon, and then disable voice calling on the second mobile device (102). If a user were to attempt to re-enable voice calling through a menu or configuration screen native to the second mobile device (102), the swap management software may also prevent that change and provide an indication to the user that such change should be made or requested through the swap management software.

Another step could include configuring and selecting (302) the types of data and features that should be either replicated or exclusively usable by one of the mobile devices. This selection could be performed on the swap management software of one the mobile devices, or could be performed via an application or web browser in communication with a server (104, 106). Configuring which data should be replicated could be useful where, for example, a user may wish to replicate address book and contact information, text message history, and email configuration, but not images and videos, from a first mobile device (100) to a second mobile device (102). Configuring which features should be exclusively usable by one device or another allows a user to determine which features of a device should be exclusively usable by only one device at a time, and which features may be used by any number of devices simultaneously. For example, if a user has two smartphones (100, 102), they may be configured to treat voice, texting, and mobile data as exclusive, while allowing email and calendar to be managed by both devices simultaneously. In this manner, voice, texting and mobile data would only be available on one device at any time, but a user could check email or calendar information using a Wi-Fi internet connection on either device at any time.

Another step could include backing up (304) data and configurations for future replication or swapping. Data backup could be performed directly from one device to another using Wi-Fi or NFC for example, or could be performed first to a cloud storage environment from where any number of other devices could access it. Backing up (304) may occur regularly based upon a configured schedule so that a user may have a high degree of synchronization of information in address books, contact information, email information, and other data between the two devices in order to minimize loss of functionality when swapping to an alternate device. Data that is stored may include data that is selected for replication (302), as well as data that is required for the use of and access to features provided from a mobile service provider. This could include, for example, data contained in a SIM card or other mobile device memory that is used to identify the device, connect the device to a mobile service provider network for voice or data, authenticate the device for access to such services, and other activities. Having such data available on each device and, in some implementations, remotely stored in a cloud storage environment allows for swapping between devices without the manual intervention of the mobile service provider.

Another step could include flagging (306) a first mobile device (100) as active upon initial configuration as well as flagging (308) a second mobile device as inactive so that the system has a proper starting state from which to enforce the exclusive features between the two devices. As previously discussed, the act of flagging (306, 308) devices as active or inactive may vary by particular implementation depending upon whether the active device information is stored on a provider server (104), a swap server (106), or the devices themselves (100, 102).

Other configurations (200) could include, for example, configuring passcodes for swapping, schedules for dates and times of automatic swapping, schedules for dates and times for restricted swapping, geographical restrictions or triggers for swapping, and configurations for permanent swapping. Permanent swapping may cause one or more features a first mobile device (100) to be swapped to a second mobile device (102) and then removing services, data or features from a first mobile device (100), which may be appropriate where a device is stolen and there is a concern that data or features on it may be used maliciously.

Figure 4:
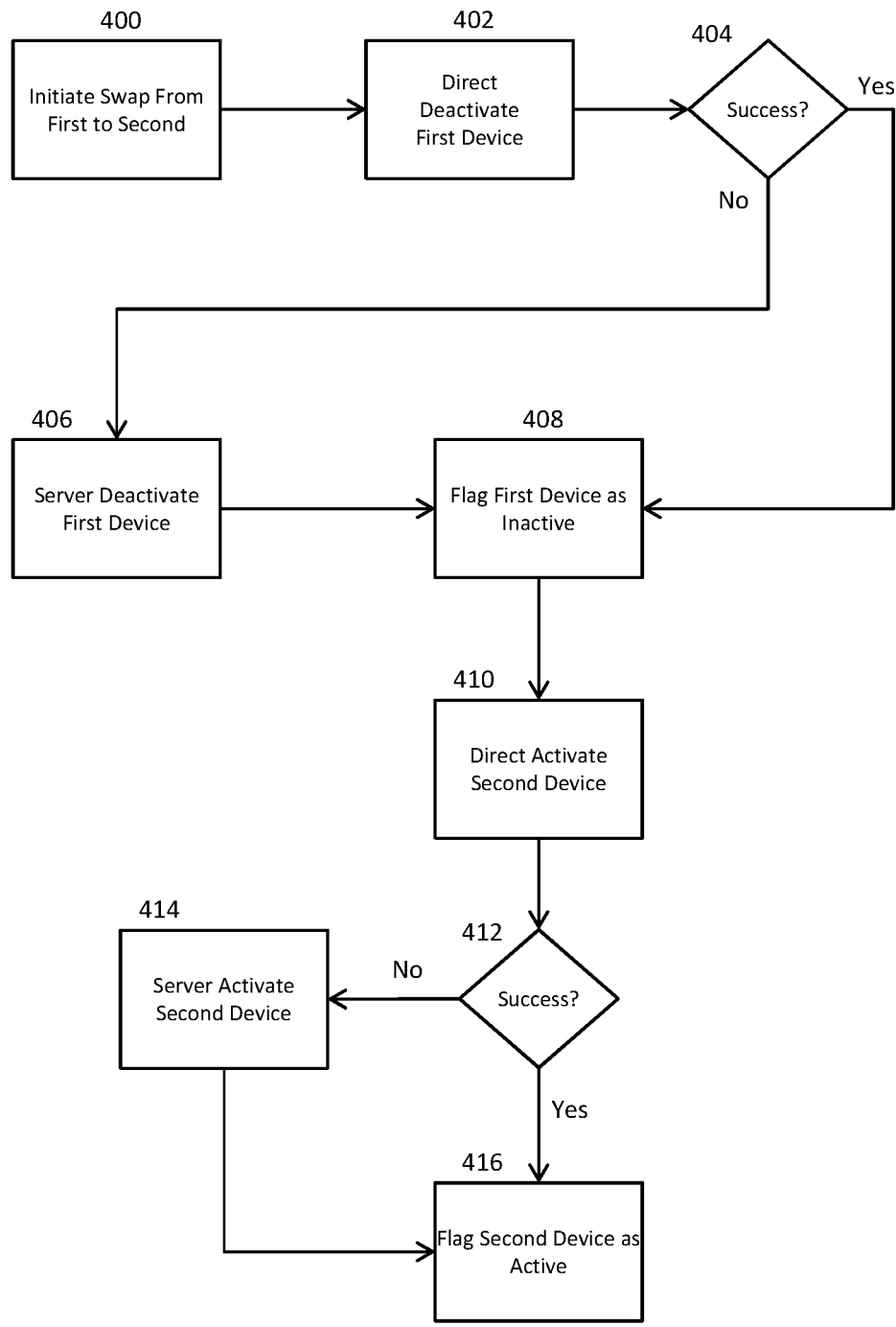
FIG. 4 is a flowchart of a set of steps that a system could perform to make a controlled swap of features from a first mobile device to a second mobile device.

Turning now to FIG. 4, that figure shows a set of steps that a system could perform to make a controlled swap of exclusive features from a first mobile device to a second mobile device. Initially, a swap from the first mobile device to the second mobile device may be initiated (400). As previously discussed, this could be initiated (400) from either of the mobile devices (100, 102) or from a web browser or desktop application in communication with a server (104, 106). In some implementations, a mobile device may be configured to automatically initiate (400) a swap whenever it is powered on. In others, a mobile device may be powered on with exclusive features disabled, and then the swap may be initiated (400) by the user using an interface of the swap management software. After a swap is initiated (400), the system may first try to directly deactivate (402) the first mobile device. If initiated from a browser or application, a direct deactivation message may be sent via Wi-Fi or another communication channel. If initiated from another mobile device, such as the second mobile device (102), the direct deactivation message may be sent via NFC, RFID, Bluetooth, Wi-Fi, or another communication channel. When the direct deactivation message is received, the first mobile device (100) may respond to indicate that the message was received and is being acted upon, and then may disable the one or more deactivated features.

If a deactivation response is received by the initiating device, it indicates a successful (404) deactivation of features in preparation for a swap. This may occur where a server (104, 106) is able to establish connection with a device that is being deactivated, or where an activated device is able to directly communicate with a device that is being deactivated. If a deactivation response is not received, such as where the device that is being deactivated is powered off or disconnected from any communication channel, this indicates a failure in direct deactivation (404), and the system will instead deactivate the device at the at the provider server (104) or swap server (106). Server deactivation (406) may be unavailable in systems that manage deactivation flags solely at a device level, as previously discussed. After the device is directly deactivated or deactivated at a server (104, 106), the database is modified to flag (408) the first mobile device (100) as inactive. At this point, any attempts by the mobile device to re-enable the disabled features will first check to see whether the device is flagged as inactive and, where it is, will prevent those features from being re-enabled.

Once the first device is successfully flagged at inactive (408), the second device may be directly activated (410). This may include, for example, a server (104, 106) attempting to communicate with the second device and instructing it to activate the features, or may include the first device communicating with the second device via NFC, RFID, Wi-Fi, or other non-exclusive communication channel and instructing it to activate features. If direct activation of the second device is successful (412), the second device may be flagged (416) as active in one or more databases. If direct activation is not successful (412), the second device may be activated (414) at the server (104, 106) if available, and the one or more databases may be updated to flag (416) the second device as active. Performed as described, the steps of FIG. 4 ensure that features such as voice, text, or mobile data that are configured to be exclusive may be activated and deactivated across devices in a way that prevents more than one device from attempting to access those features at any given time.

Figure 5:
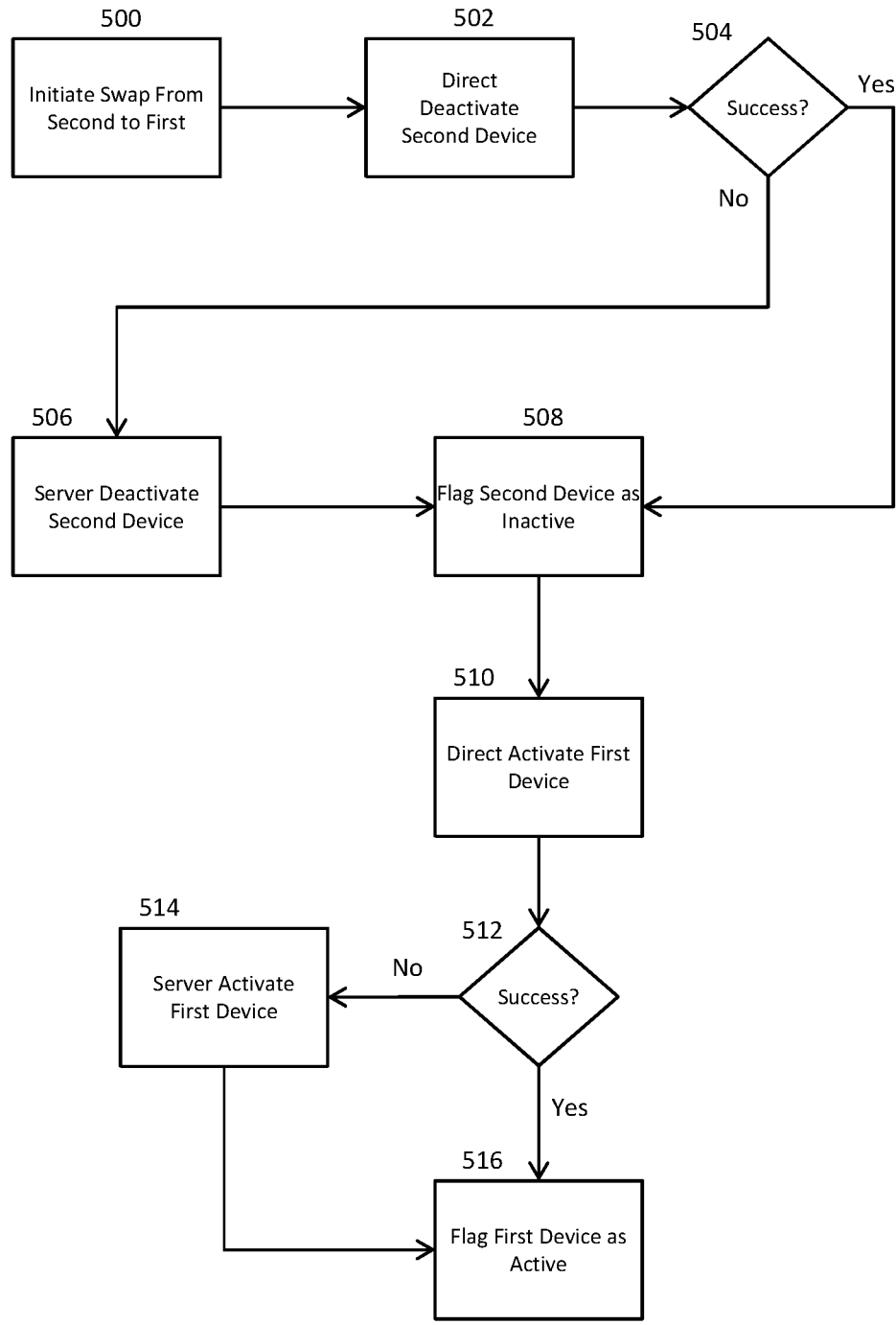
FIG. 5 is a flowchart of a set of steps that a system could perform to make a controlled swap of features from a second mobile device to a first mobile device.

FIG. 5 is a flowchart of a set of steps that a system could perform to make a controlled swap of features from a second mobile device to a first mobile device. FIG. 5 is largely the reverse of FIG. 4 described above, with a swap being initiated (500) from the second device to the first device and an attempt to directly deactivate (502) the second device. Where this is successful (512), the second device may be flagged in the databases as inactive (508). Where this is unsuccessful, the server may deactivate (506) and flag (508) the second device as inactive, so that when it comes back online it will first query the server and determine that its features have been deactivated. Once the second device is flagged as inactive (508), there may be an attempt to activate the first device (510). If successful, the first device may be flagged in the database as active (516). If unsuccessful (512), the server may activate (514) and flag (516) the first device as active, so that when it comes back online it will first query the server and determine that its features have been activated.

Further variations on, and features for, the inventor's technology will be immediately apparent to, and could be practiced without undue experimentation by, those of ordinary skill in the art in light of this disclosure. Accordingly, instead of limiting the protection accorded by this document, or by any document which is related to this document, to the material explicitly disclosed herein, the protection should be understood to be defined by the claims, if any, set forth herein or in the relevant related document when the terms in those claims which are listed below under the label "Explicit Definitions" are given the explicit definitions set forth therein, and the remaining terms are given their broadest reasonable interpretation as shown by a general purpose dictionary. To the extent that the interpretation which would be given to such claims based on the above disclosure is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

Explicit Definitions

When appearing in the claims, a statement that something is "based on" something else should be understood to mean that something is determined at least in part by the thing that it is indicated as being "based on." When something is required to be completely determined by a thing, it will be described as being "based exclusively on" the thing.

When used in the claims, "configured" should be understood to mean that the thing "configured" is adapted, designed or modified for a specific purpose. An example of "configuring" in the context of computers is to provide a computer with specific data (which may include instructions) which can be used in performing the specific acts the computer is being "configured" to do. For example, installing Microsoft® WORD on a computer "configures" that computer to provide word processing functions, which it does by using the instructions for Microsoft WORD in combination with other inputs, such as an operating system, and various peripherals (e.g., a keyboard, monitor, etc).

When used in the claims, "determining" should be understood to refer generating, selecting, defining, calculating or otherwise specifying something. For example, to obtain an output as the result of analysis would be an example of "determining" that output. As a second example, to choose a response from a list of possible responses would be a method of "determining" a response. As a third example, to identify data received from an external source (e.g., a microphone) as being a thing would be an example of "determining" the thing.

When used in the claims, a "set" should be understood to refer to a collection containing one or more objects of the type that it refers to. So, for example, a "set of integers" describes an object configured to contain an integer value, which includes an object that contains multiple integer values, an object that contains only a single integer value.

What is claimed is:

1. An activation system between two physical cell phones, the activation system being controlled by a user and comprising:
   a) a first cell phone being a smartphone;
   b) a second cell phone being a spare cell phone;
   c) a single phone number; and
   d) an access to the spare cell phone toggle which is activated by the user as follows:
      (1) toggle off/ deactivate access by the smartphone;
      (2) toggle on/ activate access the spare cell phone;
      (3) turn off/ deactivate the smartphone with the single phone number;
      (4) turn on the spare cell phone with the single phone number; and
      (5) reverse steps 1-4 to re-activate the smartphone
   wherein the first and second cell phones synch to store the same contact information with the single common phone number and wherein the user can use the spare cell phone in place of the smartphone, in an event when the smart phone is damaged, lost or stolen phone, while not losing the ability to communicate.

2. An activation method for controlling activation by a user between two physical cell phones comprising:
   Step 1: Obtaining a first cell phone being a smartphone;
   Step 2: Obtaining a second cell phone being a spare cell phone;
   Step 3: Obtaining a single phone number; and
   Step 4: Activating by the user the single phone number on the spare cell phone by:
      (A) toggle off/ deactivate access by the smartphone;
      (B) toggle on/ activate access the spare cell phone;
      (C) turn off/ deactivate the smartphone with the single phone number;
      (D) turn on the spare cell phone with the single phone number; and
      (E) reverse steps 1-4 to re-activate the smartphone
   wherein the controlling activation by the user triggers the first and second cell phones to synch and to store the same contact information with the single common phone number and wherein the user can use the spare cell phone, in place of the smartphone while not losing the ability to communicate.

* * * * *